(No Model.) 3 Sheets—Sheet 1.
J. M. WATSON.
MACHINE FOR CUTTING AND MOLDING SHANK STIFFENERS.
No. 458,027. Patented Aug. 18, 1891.
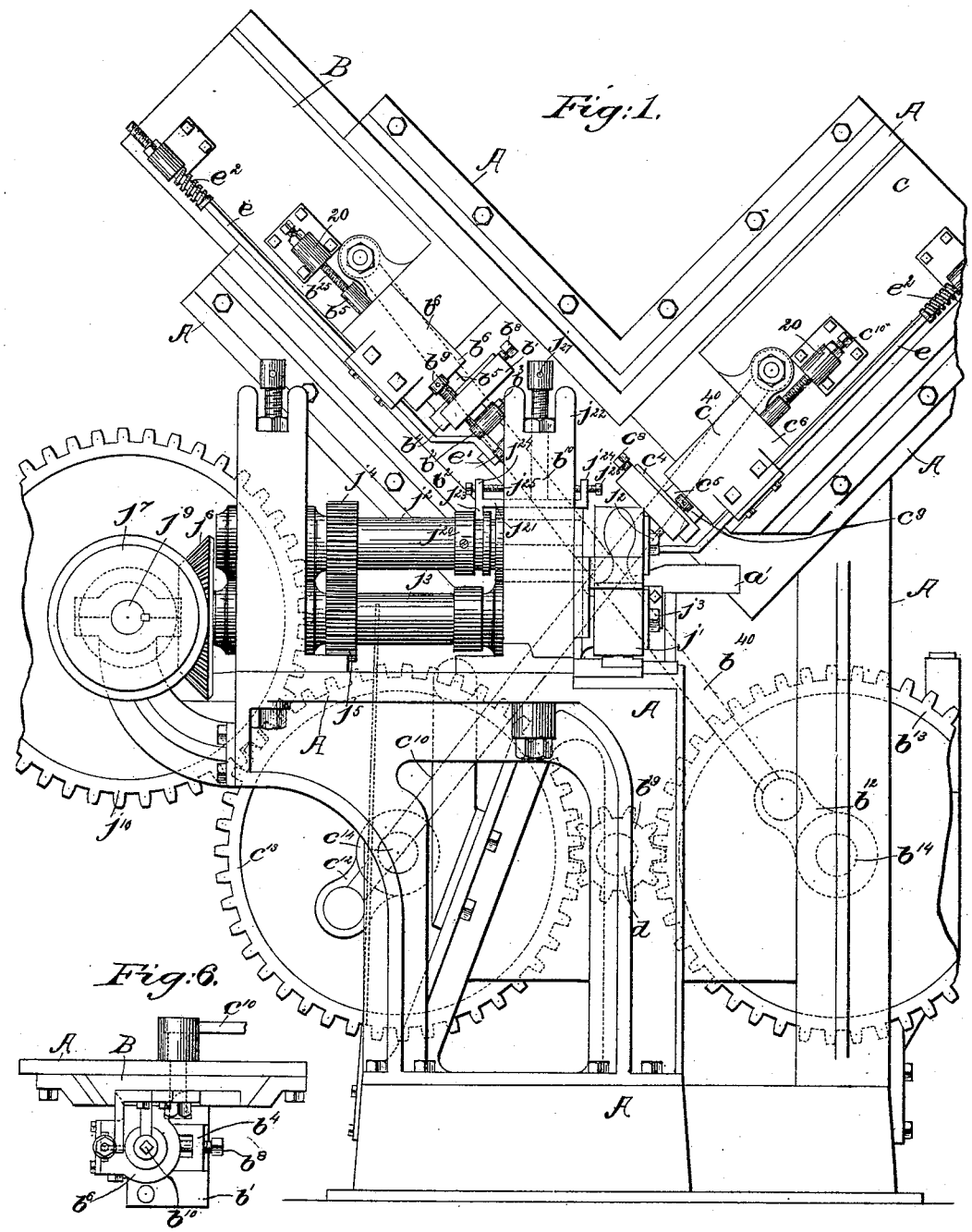
Witnesses.
Fred S. Greenleaf
Frederick L. Emery
Inventor:
Jeremiah M. Watson,
by Crosby & Gregory
attys (No Model.) 3 Sheets—Sheet 2.
J. M. WATSON.
MACHINE FOR CUTTING AND MOLDING SHANK STIFFENERS.
No. 458,027. Patented Aug. 18, 1891.
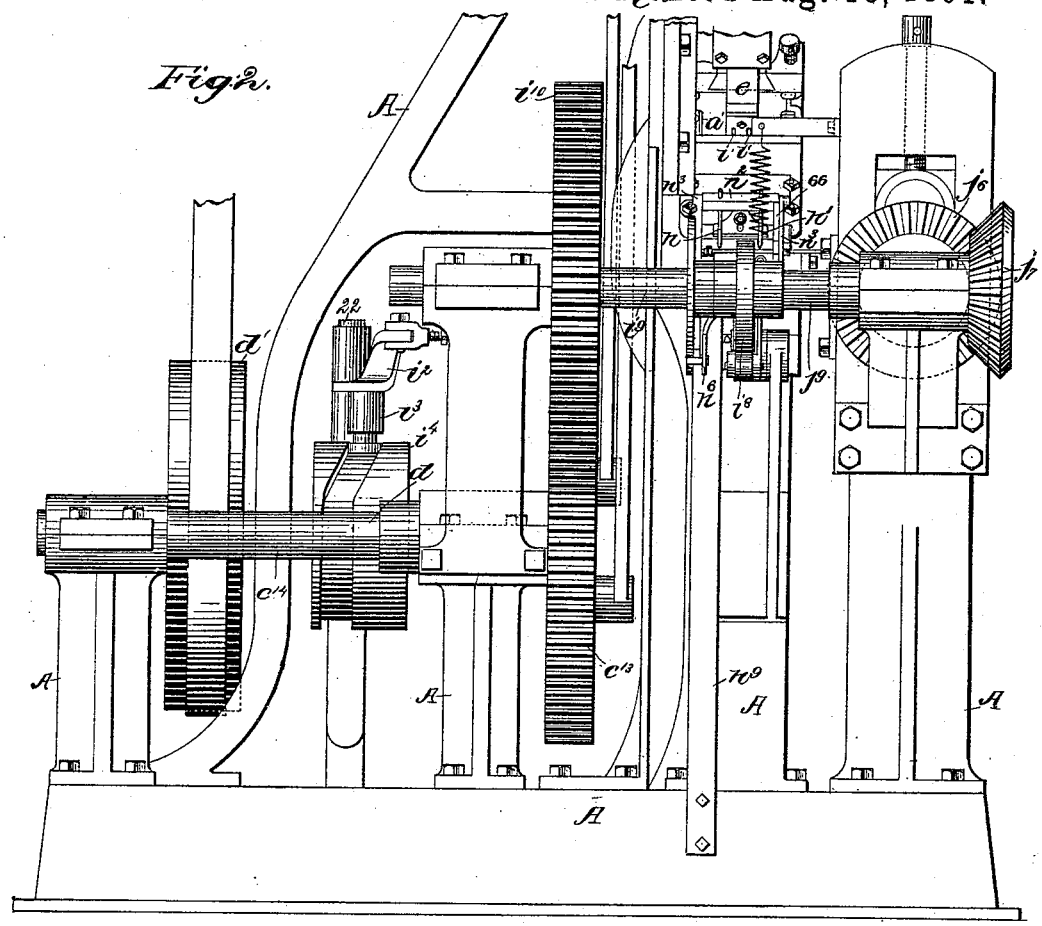
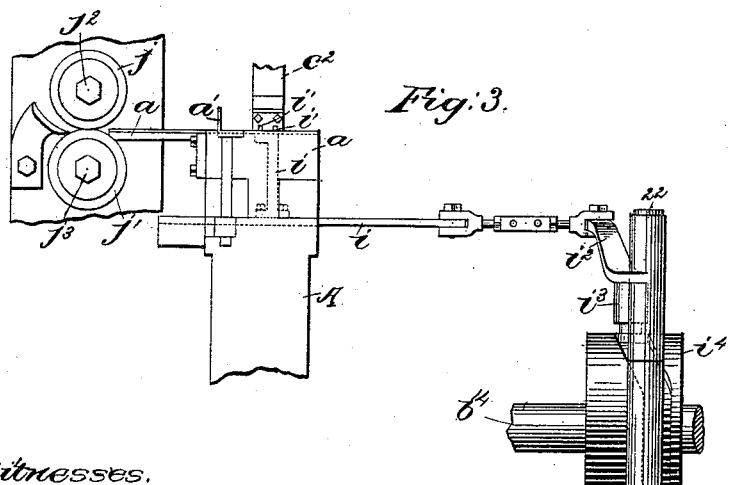
Witnesses.
Fred S. Greenleaf
Frederick L. Emery
Inventor.
Jeremiah M. Watson
by Crosby & Gregory
Attys

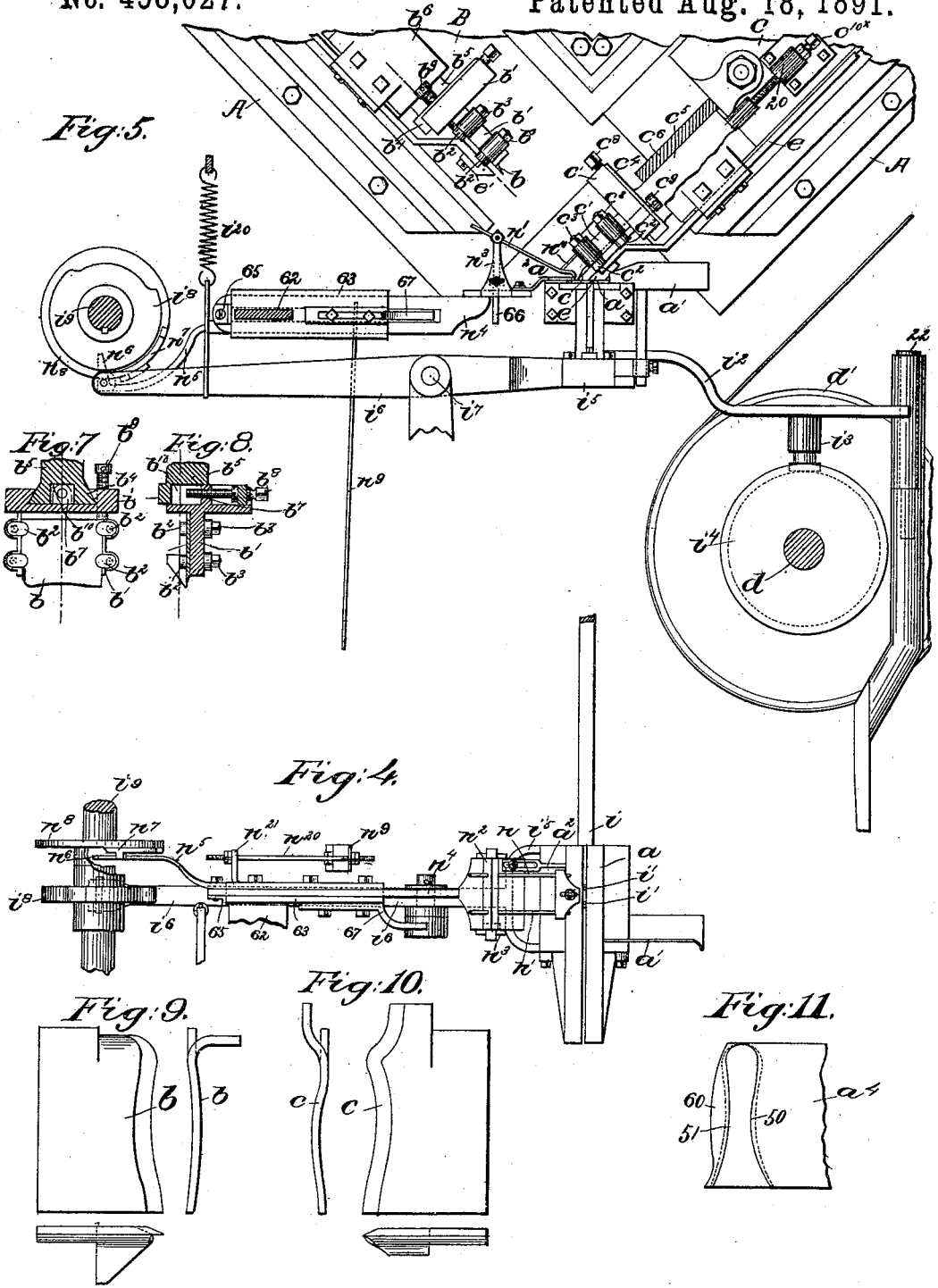

UNITED STATES PATENT OFFICE.

JEREMIAH M. WATSON, OF BOSTON, MASSACHUSETTS.

MACHINE FOR CUTTING AND MOLDING SHANK-STIFFENERS.

SPECIFICATION forming part of Letters Patent No. 458,027, dated August 18, 1891.

Application filed January 26, 1891. Serial No. 379,080. (No model.)

*To all whom it may concern:*

Be it known that I, JEREMIAH M. WATSON, of Boston, county of Suffolk, State of Massachusetts, have invented an Improvement in Machines for Cutting and Molding Shank-Stiffeners, of which the following description, in connection with the accompanying drawings, is a specification, like letters and figures on the drawings representing like parts.

This invention has for its object to construct a machine for cutting and molding shank-stiffeners.

The invention consists in the combination, with a cutting-bed, of means for cutting shank-stiffeners thereon, a molding apparatus for molding the shank-stiffeners, and feeding mechanism for feeding the shank-stiffeners from the cutting-bed to the molding apparatus.

The means herein shown for cutting the shank-stiffeners, and which I prefer to employ, consists of two knives arranged to be operated successively to cut first one and then the other side of the shank-stiffener, each knife crossing the path of movement of the other, so that they may give to the line of severance the proper bevel. Strips of leather-board or other suitable material of a width corresponding to the length of the shank-stiffener to be cut from it are fed to the successively-operating knives.

The molding apparatus herein shown, and which I prefer to employ, comprises two rotatable molds, between which the stiffeners pass, but any other well-known or suitable construction of molding apparatus may be employed.

The feeding mechanism herein shown interposed between the cutting-bed and molding apparatus, and which I prefer to employ, comprehends one having four motions and adapted to engage the cut shank-stiffener, convey it to the molding apparatus, release it at the desired point, and to return to its normal position to engage the next shank-stiffener. A suitable pick-off mechanism is also employed for removing the chips left by cutting the shank-stiffeners from the strip. As the stiffeners vary in width as well as length for different sizes, and as it is also desirable to make some stiffeners wider at the toe portion than others, the knives are made adjustable to compensate for all such desired changes.

Figure 1 shows in side elevation a machine for cutting and molding shank-stiffeners embodying this invention, broken out at the sides to save space on the drawings; Fig. 2, a rear side view of the machine shown in Fig. 1, being broken off at the top to save space; Fig. 3, a detail showing the four-motioned feeding mechanism; Fig. 4, a detail showing the pick-off mechanism; Fig. 5, a detail of the parts, showing more clearly the knives, means for adjusting them, the feeding, and the pick-off mechanism; Figs. 6, 7, and 8, details of the means for holding and adjusting the knives; Figs. 9 and 10, details of the knives; Fig. 11, a plan view of the strip of material, showing the outline of a shank-stiffener and the waste material.

The frame-work A has suitable uprights for and is of suitable shape to sustain the working parts. The cutting-bed $a$ has at one side a gage $a'$ and at one end a gage $a^2$, (see Figs. 4 and 5,) so that a strip of leather-board or other suitable material $a^4$ may be taken and quickly and accurately placed in proper position to be acted upon by the knives. Two knives $b\ c$ (see Figs. 9 and 10) are employed, the edges of which are made to produce the desired cut, and said knives are held in like carriers, as will be described. The knives $b\ c$ are curved to conform to the opposite sides of the shank-stiffener. The knife $b$ is secured to a block $b'$ by clamps $b^2$, the shanks of which pass through the block $b'$ and receive upon them nuts $b^3$, by which said clamps are drawn against the knife $b$ to hold it in place. The block $b'$ has formed in it a dovetailed groove or passage (see Figs. 7 and 8) which receives a dovetailed block $b^4$, formed integral with or secured to a cylindrical shank $b^5$, supported by a clamp $b^6$. A lug $b^7$ is formed on the block $b'$, which enters a recess $b^{70}$ in the dovetailed block $b^4$, through which passes a set-screw $b^8$, to thereby enable the block $b'$ to be adjusted back and forth on the block $b^4$. An adjusting-screw $b^9$ passes down through the block $b'$, which abuts against the upper end of the knife $b$ at one side, (see Fig. 7,) by which said knife $b$ may be adjusted to vary the width of the shank-stiffener at the toe end. The clamp $b^6$ consists of a block having a hole through it to receive the cylindrical shank $b^5$ and slitted at one side and provided at the slitted side with bolts and nuts, by means of which the said clamp may be operated to hold the shank $b^5$ in place. By loosening the nuts and turning the cylindrical shank $b^5$ in the clamp $b^6$ the block $b'$ may be rotated. An adjusting-screw $b^{25}$ passes through a lug or bracket 20, which abuts against the upper end of the shank $b^5$, and by turning this screw $b^{25}$ the said shank, and consequently the knife $b$, will be raised or lowered. The clamp $b^6$ and lug or bracket 20 are on a carriage B, arranged to slide in the frame-work. The knife $c$ is secured to a block $c'$ by clamps $c^2$, drawn into place by suitable nuts $c^3$. The block $c'$ has formed in it a dovetailed groove or passage which receives a dovetailed block $c^4$, formed integral with or secured to a cylindrical shank $c^5$, supported by a frictional bearing or clamp $c^6$. A lug is formed on the block $c'$, which enters a recess in the dovetailed block $c^4$, through which passes a set-screw $c^8$, to thereby enable the block $c'$ to be adjusted, and an adjusting-screw $c^9$ passes through the block $c'$, which abuts against the ends of the knives. By means of these screws $c^8 c^9$ the block $c'$ may be adjusted on the block $c^4$ and the knife be adjusted on the block $c'$. By turning the cylindrical shank $c^5$ in its bearings the block $c'$ may be rotated. An adjusting-screw $c^{10\times}$ passes through a lug or bracket 20 on the frame-work, which abuts against the upper end of the shank $c^5$, and by turning this screw $c^{10\times}$ the said shank, and consequently the block $c'$, will be moved longitudinally. The bearing $c^6$ of the shank $c^5$ is secured to a carriage C, made dovetailed and adapted to be moved in a dovetailed guideway formed in the frame-work A. (See Figs. 1 and 5.)

The carriages B C move at right angles with relation to each other, and each carriage is connected by a link, as $b^{40} c^{40}$, (see dotted lines, Fig. 1,) to a separate crank $b^{12} c^{12}$, borne by cog-wheels $b^{13} c^{13}$, arranged on shafts $b^{14} c^{14}$, in alignment and in mesh with an intermediate pinion $b^{19}$, secured to the driving-shaft $d$, to which the driven pulley $d'$ is secured. The cranks $b^{12} c^{12}$ are set opposite to each other, as shown in Fig. 1, so that when one of the carriages—as B, for instance—is in its elevated position the other carriage, as C, will be in its lowermost position, or thereabout. The result of this arrangement is the successive operation of the knives, in contradistinction to the simultaneous operation thereof.

The knives moving at right angles with relation to each other, as shown, each crosses the path of movement of the other, so that the knife $b$ at the rear will cut the front side of the shank-stiffener, as the line 50, Fig. 11, and the knife $c$ at the front will cut the rear side of the shank-stiffener, as the line 51, and by such diagonal movement the edges of the shank-stiffener will be beveled. As the driving-shaft revolves, one of the knives—$b$, for instance—will be depressed and will cut the material on the cutting-bed, and as the knife $b$ retreats the other knife $c$ will cut the material on the cutting-bed. The strip of material to be cut will be reversed for each shank-stiffener, to thereby save stock.

On each carriage B and C is a yielding presser, (represented as a bar $e$,) bent at its lower end and having on it a beveled-faced block $e'$ and cushioning at its upper end against a spring $e^2$. The block $e'$ projects slightly beyond the knife, so that when the carriage is depressed the block $e'$ strikes the material to hold it in place, the presser yielding as the knife advances. While the material is held down on the cutting-bed by the presser, the feeding mechanism employed for conveying the cut shank-stiffener to the molding apparatus begins to operate.

The cutting-bed $a$ is slitted, as represented in Fig. 4, and beneath said bed a feed-bar $i$ is placed, having one or more vertical awls $i'$ secured to it, the awls extending nearly to the surface of the cutting-bed. The feed-bar $i$ (see Figs. 3 and 4) is connected by a universal-joint connection with an arm of a lever $i^2$, pivoted to a stud 22 and having a roll $i^3$, which enters a groove in a cam-grooved hub $i^4$, secured to the shaft carrying the cog-wheel $b^{13}$. As the cam-grooved hub $i^4$ revolves, the feed-bar $i$ is reciprocated longitudinally. The feed-bar $i$ has its bearings in a yoke $i^5$ on one end of the lever $i^6$, pivoted at $i^7$ to the frame-work, the opposite end of said lever $i^6$ preferably having on it a friction-roll which by a spring $i^{20}$ is borne against a cam $i^8$, secured to the shaft $i^9$, having the toothed wheel $i^{10}$, which meshes with the cog-wheel $c^{13}$. As the cam $i^8$ is revolved, the lever $i^6$ will be moved on its pivot $i^7$ and the yoke $i^5$ raised and lowered. As the yoke $i^5$ is moved, the feed-bar $i$ carried by it will be correspondingly moved. The operation of this feeding mechanism is as follows: The presser, having been depressed, firmly holds the material on the cutting-bed. The yoke $i^5$ is then lifted and the awls $i' i'$ enter the material of one of the shank-stiffeners cut from the strip. While the yoke is thus held in its elevated position, the feed-bar $i$ will be moved longitudinally by the cam-grooved hub $i^4$ into position to deliver it to the molding apparatus, to be described. As soon as the awls arrive in this position, carrying with them the shank-stiffener, the yoke $i^5$ will fall, removing the awls from the shank-stiffener, and immediately thereafter the feed-bar $i$ will be returned to its normal position by the cam-grooved hub $i^4$. Thus it will be seen that this feeding mechanism comprehends four motions—viz., a vertical movement to engage the shank-stiffener, a horizontal movement to deliver it to the molding apparatus, a descending movement to release the shank-stiffener at such point, and a return horizontal movement to its normal position.

The molding apparatus consists of a cylindrical mold $j$ and a plane-surfaced roll $j'$, said mold and roll being secured to shafts $j^2 j^3$, arranged in bearings parallel to each other, one of which, as $j^2$, has on it a toothed wheel $j^4$, which is engaged by a toothed wheel $j^5$ on the shaft $j^3$, and a beveled gear $j^6$ is also secured to said shaft $j^3$, which is engaged by a beveled gear $j^7$, secured to the shaft $i^9$. The cutting-bed $a$ is extended to a point between the rolls $j j'$, as best shown in Fig. 3, to deliver the shank-stiffeners to the rolls properly. As the shaft $i^9$ is revolved, the rolls $j j'$ will be revolved and the shank-stiffeners carried between them and molded. The shaft $j^2$ has secured to it a collar $j^{20}$, having a circumferential groove, and a bar $j^{21}$ passes through a hole or recess in the housing $j^{22}$, said bar $j^{21}$ having on it at one end a lip $j^{23}$, which enters the groove in the collar $j^{20}$. The bar $j^{21}$ has also at each end a projection $j^{24}$, through which set-screws $j^{25}$ pass, bearing against the housing $j^{22}$. By means of these set-screws $j^{25}$ the bar $j^{21}$ may be adjusted longitudinally, and hence the shaft $j^2$ may be moved longitudinally. A set-screw $j^{27}$ passes down through the housing to assist in holding the bar $j^{21}$ in place. By such adjustment the mold $j$ may be moved that it may be brought into alignment with the feeding mechanism. As before stated, in lieu of this particular form of molding apparatus any other well-known form of molding apparatus may be employed.

As the shank-stiffeners are cut from the strip small pieces or chips, as 60, (see Fig. 11,) are left between each shank-stiffener, which it is necessary should be removed, and hence I have provided suitable mechanism for removing or picking off these pieces, which, as herein shown, consists of two prongs $n n'$, (see Fig. 4,) attached to a bar $n^2$, held frictionally in a frame $n^3$, secured to a slotted bar $n^4$, mounted on a suitable guide-plate 63, formed integral with the arm 62 on the framework, and the bar $n^4$ at its rear end has a downwardly-extended portion $n^5$, with an upturned end $n^6$, which is adapted to be engaged by a cam projection $n^7$ on a disk $n^8$. The bar $n^4$, carrying the frame $n^3$ and pick-off prongs, is held in its forward position by a flat spring $n^9$, adjustably connected to the said bar $n^4$ by a rod $n^{20}$, passing through a projection $n^{21}$ on said bar. The arm $n^4$ has secured to it at its rear end a stop 65, which limits the forward movement of the arm $n^4$ by striking against the guide-plate 63. An arm 66, attached to or formed integral with the cross-bar $n^2$, extends downwardly, as shown in Fig. 5, and an arm 67 is adjustably connected to the guide-plate 63, which lies in the path of movement of the arm 66, and is adapted to strike said arm 66 when the bar $n^4$ has been withdrawn sufficiently to remove the chip 60. As the arm 66 is struck by the arm 67, the cross-bar $n^2$ will be turned to lift the pick-off prongs $n n'$. The bar $n^4$ is held in its frame $n^3$ frictionally, so as to remain in whatever position it may be placed.

When both knives $b c$ are removed from the cutting-bed $a$, the pick-off prongs $n n'$ will occupy a position above the cutting-bed. When the strip from which the shank-stiffeners are to be cut is placed on the bed, it is guided beneath the said pick-off prongs $n n'$. As one of the knives—as $c$, for instance—approaches the cutting-bed, a plate $n^{10}$ thereon strikes the said pick-off prongs $n n'$ and drives them into the material at a point at one side of the knife $c$, which will be within the outline of the chip or piece 60 to be removed. When the shank-stiffener has been cut, the cam projection $n^7$ strikes the projecting end $n^6$ and withdraws the pick-off prongs $n n'$, so that the chip or piece will be removed from the cutting-bed. The pick-off prongs are returned to their normal or forward position by means of the spring $n^9$, as before stated.

I do not desire to limit myself to the particular construction of pick-off mechanism, as it may be changed and not depart from the spirit and scope of this invention.

While I have herein shown successively-operating knives for cutting out the shank-stiffeners, I do not desire to limit my invention to this construction when combined with a molding apparatus and interposed feeding mechanism.

The cylindrical mold $j$ is made as a metal roll, having a cavity (see Fig. 1) of the shape it is desired to impart to the finished stiffener.

Instead of the particular form of feeding mechanism shown, I may employ any other usual or suitable form of feeding mechanism common in sewing and other machines. It is not intended to limit this invention to the exact mechanism shown for reciprocating the knives or blades for cutting the stiffeners, nor to the exact devices shown for actuating the molding apparatus shown as rolls.

I claim—

1. A machine for cutting and molding shank-stiffeners, containing the following instrumentalities, viz: a cutting-bed, two knives movable at right angles with relation to each other and each arranged to cross the path of movement of the other for cutting the shank-stiffeners, suitable actuating devices for said knives or blades, a molding apparatus for molding the shank-stiffeners, comprising the cylindrical mold $j$ and the plane-surfaced mold $j'$, and feeding mechanism interposed between the cutting-bed and molding apparatus for feeding the shank-stiffeners from the cutting-bed to said molding apparatus, substantially as described.

2. In a machine for cutting and molding shank-stiffeners, a slotted cutting-bed, and knives for cutting the shank-stiffeners, combined with a set of awls, means for moving them vertically through the slit in the cutting-bed to engage a shank-stiffener, and means for moving them horizontally to move the shank-stiffener, substantially as described.

3. In a machine for cutting and molding shank-stiffeners, the cutting-bed, and knives for cutting the shank-stiffeners, combined with a molding apparatus and a four-motion feeding mechanism for conveying the shank-stiffener from the cutting-bed to the molding apparatus, substantially as described.

4. In a machine for cutting and molding shank-stiffeners, the molding apparatus, and a feeding mechanism for conveying the shank-stiffeners from the cutting-bed to the molding apparatus, said feeding mechanism comprising a set of awls, means for moving them vertically, and means for moving them horizontally, substantially as described.

5. In a machine for cutting and molding shank-stiffeners, a cutting-bed, and means for cutting the shank-stiffeners, combined with a molding apparatus and a feeding mechanism for conveying the shank-stiffeners from the cutting-bed to the molding apparatus, consisting of a set of vertically and horizontally movable awls, substantially as described.

6. In a machine for cutting shank-stiffeners, a cutting-bed, and means for cutting the shank-stiffeners thereon, a molding apparatus and feeding mechanism, and a pick-off to remove the chips cut from the stiffeners, substantially as described.

7. In a machine for cutting shank-stiffeners, a cutting-bed, two knives movable at right angles with relation to each other and each arranged to cross the path of movement of the other, combined with yielding pressers and a pick-off mechanism, substantially as described.

8. In a machine for cutting shank-stiffeners, a cutting-bed, two knives movable at right angles with relation to each other and each arranged to cross the path of movement of the other, means for moving said knives successively, combined with pick-off mechanism consisting of pick-off prongs, and means for moving them to enter the material to thereafter remove the material, substantially as described.

9. In a machine for cutting shank-stiffeners, a cutting-bed, two knives moving at right angles with relation to each other and each arranged to cross the path of movement of the other, and a knife-carrier for each knife-consisting of adjustable and rotatable blocks, substantially as described.

10. In a machine for cutting shank-stiffeners, a cutting-bed, and two knives, as $b$ $c$, each arranged to cross the path of movement of the other, combined with a carrier for each knife, consisting of a block $c'$, clamps for holding the knife in place thereon, a block $c^4$, and means for adjusting one with relation to the other, the cylindrical shank $c^5$ and support therefor, substantially as described.

In testimony whereof I have signed my name to this specification in the presence of two subscribing witnesses.

JEREMIAH M. WATSON.

Witnesses:
JAS. H. CHURCHILL,
EDWARD F. ALLEN.